United States Patent [19]

Niimi et al.

[11] Patent Number: 5,034,177
[45] Date of Patent: Jul. 23, 1991

[54] METHOD FOR MOLDING SATURATED CRYSTALLINE POLYESTERS

[75] Inventors: Hiroji Niimi; Takashi Satake; Kunio Tomita, all of Kuga, Japan

[73] Assignee: Mitsui Petrochemical Industries, Ltd., Tokyo, Japan

[21] Appl. No.: 452,601

[22] Filed: Dec. 19, 1989

[30] Foreign Application Priority Data

| Dec. 20, 1988 | [JP] | Japan | 63-321159 |
| Dec. 20, 1988 | [JP] | Japan | 63-321160 |
| Dec. 20, 1988 | [JP] | Japan | 63-321161 |
| Dec. 20, 1988 | [JP] | Japan | 63-321162 |
| Dec. 20, 1988 | [JP] | Japan | 63-321163 |

[51] Int. Cl.$^5$ .............. B29B 13/02; B29C 35/02; B29C 49/06
[52] U.S. Cl. .............. 264/331.21; 264/328.14; 264/328.17; 264/349; 264/537; 264/532; 264/DIG. 65
[58] Field of Search .............. 264/211.21, 537, 538, 264/521, 328.14, 328.17, 328.19, 235, 346, DIG. 65, 349, 532, 331.21; 425/205, 580

[56] References Cited

U.S. PATENT DOCUMENTS

| 2,309,729 | 2/1943 | Gordon | 264/328.14 |
| 2,442,368 | 6/1948 | Maynard | 264/328.14 |
| 2,831,214 | 4/1958 | Eyles et al. | 264/328.14 |
| 4,022,863 | 5/1977 | Karass et al. | 264/DIG. 65 |
| 4,501,713 | 2/1985 | Wright | 264/235 |
| 4,670,203 | 6/1987 | Chang | 264/328.18 |
| 4,863,652 | 9/1989 | Chang | 264/211.21 |
| 4,867,665 | 9/1989 | Wada | 425/205 |

FOREIGN PATENT DOCUMENTS

| 256777 | 2/1988 | European Pat. Off. | 264/538 |
| 57-39937 | 3/1982 | Japan | 264/328.17 |

Primary Examiner—Jan H. Silbaugh
Assistant Examiner—Catherine Timm
Attorney, Agent, or Firm—Sherman and Shalloway

[57] ABSTRACT

A crystalline saturated polyester resin such as polyethylene terephthalate, is molded into a desired shape in a molding machine under conditions such that the crystallization temperature of the resulting molded article is within 20° C. of the crystallization temperature of the starting saturated crystalline polyester resin. This is accomplished by preheating the resin in the molding apparatus to a temperature above its melting point to lower the viscosity of the resin to such an extent that the resin is not substantially degraded in the compression section of the molding machine. By avoiding reductions in the crystallization temperature of the molded resin, the resin can be shaped by, for example, blow molding into a bottle or other configuration while satisfying simultaneously the requirements for transparency and dimensional stability. The molded polyester articles obtained from the present invention are substantially free from chalking and variation in internal volume and are excellent in heat resistance.

5 Claims, 3 Drawing Sheets

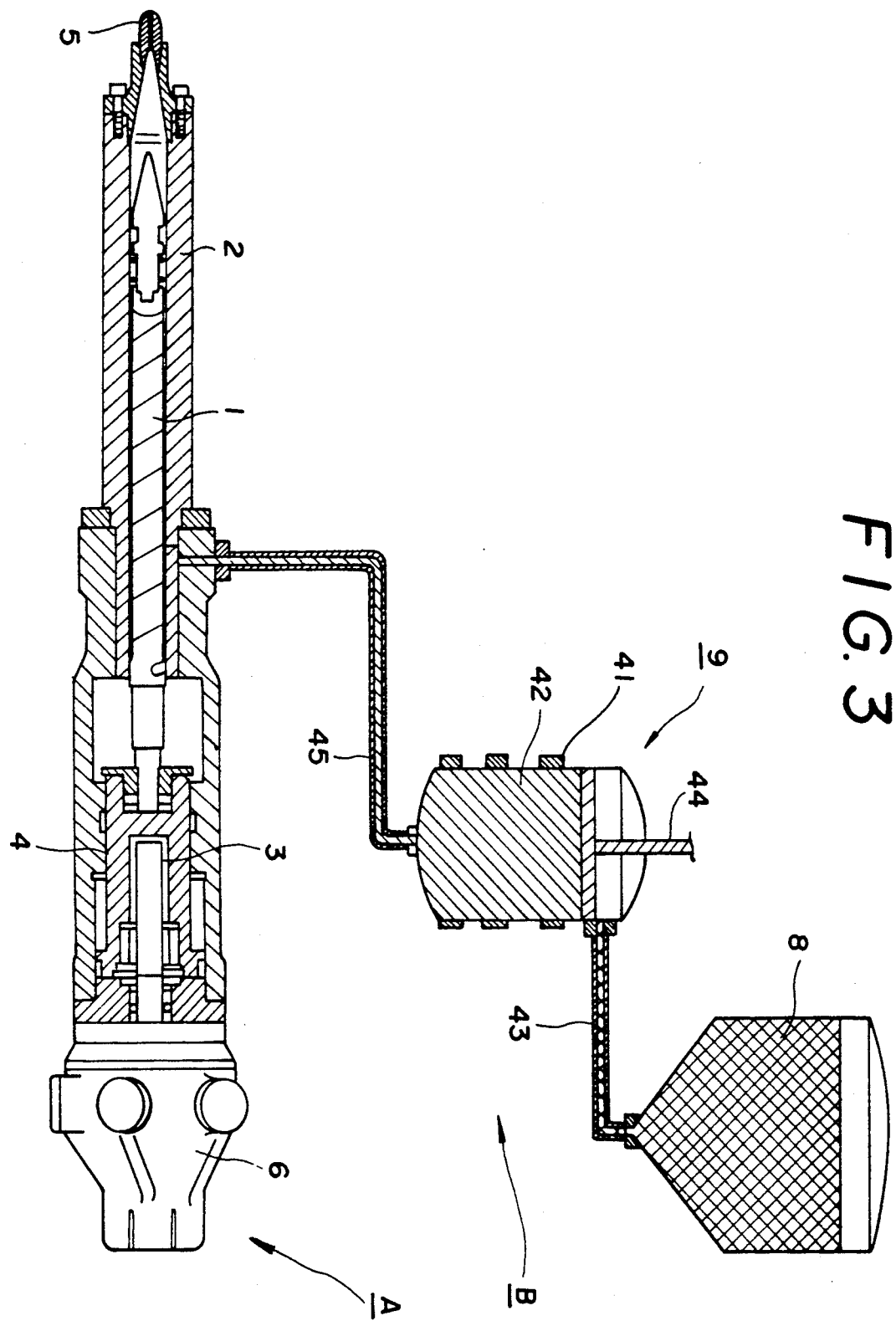

METHOD FOR MOLDING SATURATED CRYSTALLINE POLYESTERS

FIELD OF THE INVENTION

This invention relates to a method for molding saturated crystalline polyesters and more particularly to the method for molding saturated crystalline polyesters, by which molded articles such as containers or the like excellent in transparency, heat resistance and form stability can be obtained from saturated crystalline polyester resins, and molding apparatus used therefor.

BACKGROUND OF THE INVENTION

Heretofore, glass has been widely used as a material for forming containers for seasonings, oils, juices, carbonated drinks, beer, Japanese sake, cosmetics, detergents, etc. Usually, however, because of relatively high production costs of glass containers, empty containers after use are recovered and circulated for re-use. Furthermore, glass containers had such drawbacks that because they are heavy, costs of transport increase and, in addition thereto, they are easy to break and difficult to handle.

In order to solve such drawbacks associated with glass containers, various plastic containers have recently come to be used rapidly in substitution for glass containers. Various plastics are used as materials for plastic containers according to the kind of the contents to be contained and to the purpose for which the contents are used. Of such plastics materials, saturated crystalline polyester resins such as polyethylene terephthalate and the like are excellent in mechanical strength, heat resistance, transparency and gas barrier properties, and are used as materials for containers for juices, cooling beverages, carbonated drinks, seasonings, detergents, cosmetics and the like. Of the plastic containers used for such purposes as mentioned above, blow molded containers for juices, cooling beverages and carbonated drinks are required to be subjected to sterilizing and high-temperature filling. On that account, the blow molded containers must be molded from heat resistant resins capable of withstanding the high-temperature filling operation, and such blow molded containers for filling purposes are required to be excellent in transparency and form stability such as uniformity in internal space.

As stated above, saturated crystalline polyester resins are plastics excellent in physical properties, but no saturated crystalline polyester resins simultaneously having the above-mentioned transparency, heat resistance capable of withstanding the high-temperature filling operation and form stability have been known heretofore.

Especially, there was such a serious problem that when a saturated crystalline polyester resin such as polyethylene terephthalate is fed to a molding machine such as an injection molding machine to prepare a preform for blow molded article, and this preform is then blow molded into a blow molded container, the resulting blow molded container chalks and deteriorates in transparency. On that account, the blow molded containers that were deteriorated in transparency are unavoidably discarded, resulting in a sharp decrease of the yield of the products.

There have been proposed various processes for molding saturated crystalline polyester resins such as polyethylene terephthalate into blow molded containers which are heat resistant, for example, a process in which heat resistant resins such as polyallylate are laminated on the polyester blow molded containers (Plastics, Vol. 1, 36 (No. 9), 121 (1985), a process in which the polyester blow molded containers as molded are subjected to heat setting (Japanese Patent Publn. No. 3301/1984, Japanese Patent L-O-P Publns. Nos. 12031/1980, 75833/1981 and 13142/1981) and a process in which the containers as molded are improved in crystallinity by subjecting them to solvent treatment. These processes as cited above are all intended to impart heat resistance to saturated crystalline polyester resins such as polyethylene terephthalate which are inherently insufficient in heat resistance by means of molding means or treatment after molding. In all the blow molded containers obtained by every one of the above-cited processes the transparency and form stability are not sufficiently satisfactory, and hence the advent of blow molded containers consisting essentially of saturated crystalline polyester resins and having excellent transparency and form stability has been earnestly desired.

With the view of obtaining blow molded containers excellent in transparency and form stability from saturated polyester resins, the present inventors prosecuted extensive research. As the result, they have found that the reason why blow molded containers consisting of saturated crystalline polyester resins chalk and decrease in transparency and further decrease in form stability is that in a process of preparing a preform for blow molded article from saturated crystalline polyester resins by injection molding or the like, said saturated crystalline polyester resins are heated, fused and sheared, whereby the crystallizing temperature (Tc) of the saturated crystalline polyester resins decreases, and that blow molded articles obtained from the preform consisting of saturated crystalline polyester resins having a decreased crystallizing temperature (Tc) will come to chalk. On the basis of the technical information obtained above, the present inventors continued a further investigation and have eventually accomplished the present invention based on their finding that if saturated crystalline polyester resins are molded into molded articles using a molding machine under specific conditions, the crystallizing temperature of said unsaturated crystalline polyester resins will not decrease, whereby the molded articles obtained, such as blow molded articles, are found to be excellent in transparency and form stability.

OBJECT OF THE INVENTION

The present invention has been accomplished in light of such circumstances as mentioned above under which conventional blow molded articles formed from saturated crystalline polyester resins are placed, and an object of the invention is to provide processes for molding saturated crystalline polyester resins, by which molded articles such as blow molded containers excellent simultaneously in transparency and form stability can be obtained.

In another aspect, a further object of the invention is to provide molding equipment for unsaturated crystalline polyester resins, by which molded articles such as blow molded containers excellent simultaneously in transparency and form stability can be obtained from said unsaturated crystalline polyester resins.

SUMMARY OF THE INVENTION

The first process of the present invention for molding a saturated crystalline polyester resin into a desired form by feeding said resin to a molding machine having a screw and equipped with a feed section, a compression section and a metering section is characterized by heating said polyester resin in the molding machine to a temperature above the melting point thereof so that the heated resin in a substantially molten state reaches the compression section, wherein a crystallizing temperature Tc2 of the resulting molded article and a crystallizing temperature Tc1 of the starting saturated crystalline polyester resin satisfy a relationship of Tc1−20≦Tc2≦Tc1.

The second process of the invention for molding a saturated crystalline polyester resin into a desired form by feeding said resin to a molding machine, 15 characterized by heating said polyester resin to a temperature above the melting point and feeding the heated polyester resin in a substantially molten state to the molding machine, wherein a crystallizing temperature Tc2 of the resulting molded article and a crystallizing temperature Tc1 of the starting saturated polyester resin satisfy a relationship of Tc1−20≦Tc2≦Tc1.

The molding equipment for molding a saturated crystalline polyester of the present invention which comprises a main body of molding machine for molding a starting molten saturated crystalline polyester resin into a desired form and a starting resin feed section for feeding the starting resin to said main body is characterized by comprising a drying hopper for permitting said starting resin feed section to dry said starting resin by heating to a temperature below the melting point thereof, a fusion section for fusing the dried starting resin by further heating the same, and a quantitative feed section for quantitatively feeding the fused starting resin to the main body of molding machine.

The saturated crystalline polyester molded articles obtained by the present invention are excellent in transparency and dimensional stability, free from chalking and variation in internal volume, and also excellent in heat resistance.

BRIEF DESCRIPTION OF THE DRAWINGS

FIGS. 1–3 are each a sectional view of the molding equipment for saturated crystalline polyester of the present invention.

Figure 1:
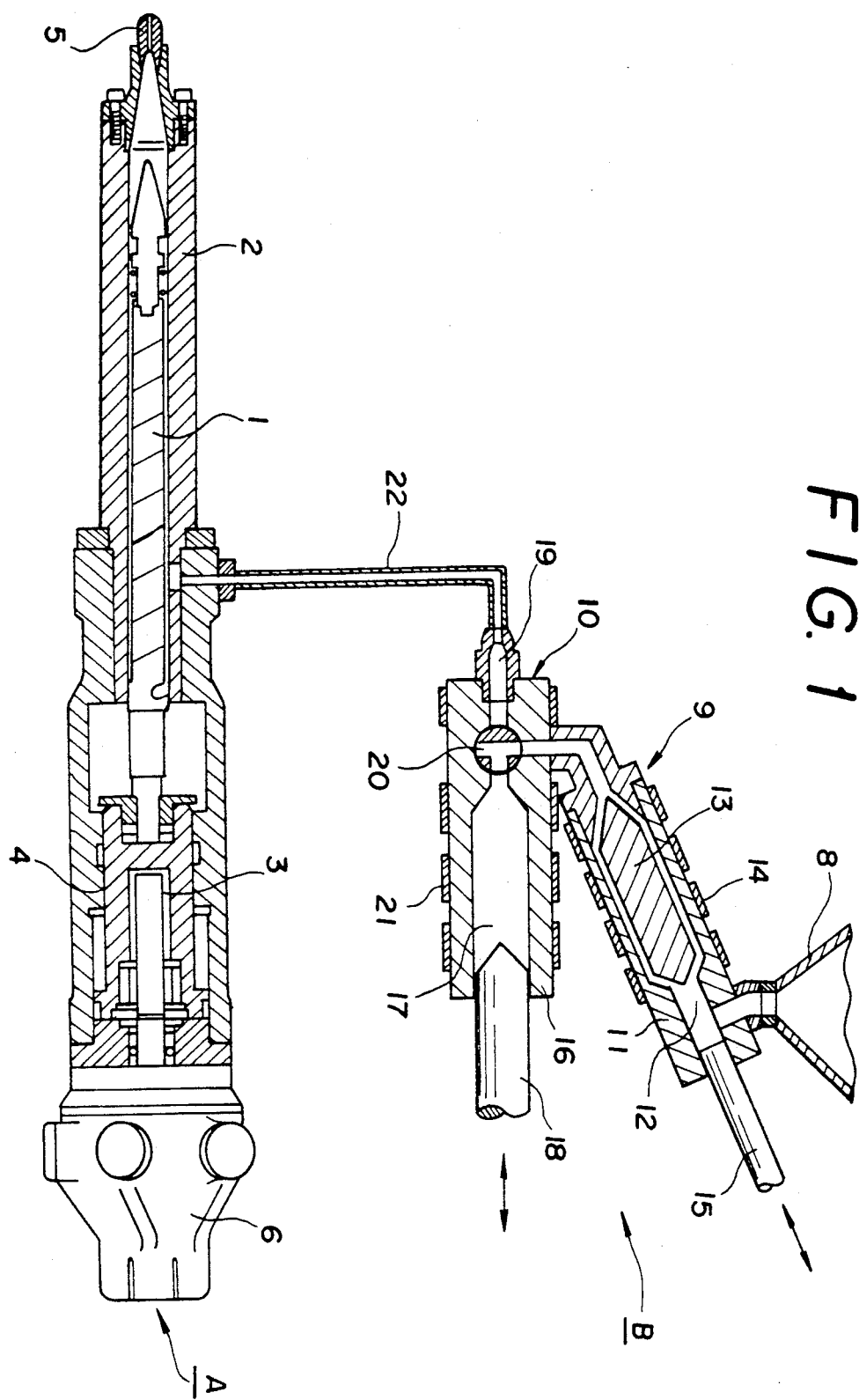

A . . . Main body of molding machine
B . . . Starting resin feed section
8 . . . Drying hopper
9 . . . Fusion section
10 . . . Quantitative feed section

DETAILED DESCRIPTION OF THE INVENTION

Hereinafter, the process for molding saturated crystalline polyester resins of the present invention is illustrated.

The saturated crystalline polyesters used in the present invention as the starting resins are polyesters which are formed from dihydroxy compound units and dicarboxylic acid units. The dihydroxy compound units are those selected from among aliphatic glycols such as ethylene glycol, propylene glycol, 1,4-butanediol, neopentyl glycol, hexamethylene glycol, etc., alicyclic glycols such as cyclohexane dimethanol, etc., aromatic dihydroxy compounds such as bisphenol, etc., or two or more kinds of these compounds, and the dicarboxylic acid units are those selected from among aromatic dicarboxylic acids such as terephthalic acid, isophthalic acid, 2,6-naphthalenedicarboxylic acid, etc., aliphatic dicarboxylic acids such as oxalic acid, succinic acid, adipic acid, sebacic acid, undecadicarboxylic acid, etc., alicyclic dicarboxylic acids such as hexahydroterephthalic acid, etc., or two or more kinds of these compounds. Such polyesters as mentioned above may be modified with small amounts of polyhydroxy compounds and polycarboxylic acids having at least three valences such as triol and tricarboxylic acid.

Concrete examples of the saturated crystalline polyester resins illustrated above are polyethylene terephthalate, polybutylene terephthalate and polyethylene isophthalate/terephthalate copolymers.

Of these saturated crystalline polyesters mentioned above, preferred are those containing ethylene glycol and terephthalic acid as the main components because of their excellent stretchability, mechanical strength and chemical properties, and especially polyethylene terephthalate and copolymers thereof are preferred because they are easy to mold and excellent in stiffness, mechanical strength and economy.

The starting polyethylene terephthalate used desirably in the present invention is illustrated below.

In the starting polyethylene terephthalate particularly useful in the invention, the content of ethylene terephthalate units (a) represented by the general formula [I],

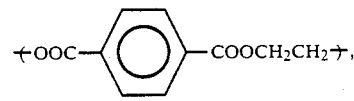

is in the range of 95.0–98.6 mol %, preferably 97.0–98.5 mol % and especially 97.3–98.3 mol %, and the content of dioxyethylene terephthalate units (b) represented by the general formula [II],

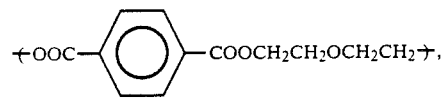

is in the range of 1.4–5.0 mol %, preferably 1.5–3.1 mol % and especially 1.7–2.6 mol %.

The starting polyethylene terephthalate as illustrated above forms a substantially linear polyester in which the above-mentioned ethylene terephthalate units (a) of the general formula (a) and dioxyethylene terephthalate units (b) are arranged randomly so as to form an ester linkage. That the above-mentioned polyethylene terephthalate is substantially linear in structure is confirmed by the fact that said polyethylene terephthalate dissolves in o-chlorophenol.

The starting polyethylene terephthalate desirably used in the present invention preferably has an intrinsic viscosity [η], as measured at 25° C. in o-chlorophenol, of 0.60–1.00 dl/g, preferably 0.70–0.87 dl/g and especially 0.72–0.85 dl/g. When this intrinsic viscosity [η] is smaller than 0.60 dl/g, there is a tendency that blow molded containers excellent in heat resistance, transparency and mechanical strength will come to be unobtainable, and when said intrinsic viscosity [η] is larger than 1.00 dl/g, there is a tendency that the preform will come to deteriorate in moldability and stretch blow moldability. In this connection, the intrinsic viscosity [η] of the starting polyethylene terephthalate is measured by the following procedure. That is, a specimen of the polyethylene terephthalate is dissolved in o-chlorophenol at a concentration of 1 g/100 ml, and a viscosity of the solution is measured at room temperature by means of a Ubbellode capillary viscometer, and thereafter o-chlorophenol is gradually added to the solution to measure a viscosity of the solution at a low concentration side, whereby an intrinsic viscosity [η] is obtained by extrapolation based on 0% concentration.

The preferred starting polyethylene terephthalate as mentioned above preferably has a programmed-temperature crystallizing temperature (Tcl) of at least 155.0° C., preferably 167.0–185° C. and especially 168.0–180.0° C. In relation to the intrinsic viscosity [η], this programmed temperature crystallizing temperature of the polyethylene terephthalate is preferably in the range of the following equation $$67.5[\eta] + 119.0 \leq Tcl \leq 67.5[\eta] + 133.5,$$

further preferably $$67.5[\eta] + 122.5 \leq Tcl \leq 67.5[\eta] + 128.5.$$

When the programmed-temperature crystallizing temperature (Tcl) of the starting polyethylene terephthalate becomes lower than 165.0° C, the resulting blow molded containers tend to decrease in transparency and also in heat resistance and to bring about heat deformation at the time of high-temperature filling the resultant containers with cooling beverage such as juice or carbonated beverage. When this programmed-temperature crystallizing temperature (Tcl) becomes lower than the value of lower limit of the above-mentioned equation, the resulting blow molded containers tend likewise to bring about heat deformation when the containers are high-temperature filled with cooling beverages such as juice or carbonated beverage. In this connection, the programmed-temperature crystallizing temperature (Tcl) of the starting polyethylene is measured by the following procedure. That is, about 10 mg of a sliced specimen taken out of the center portion of polyethylene terephthalate chip dried at about 40° C. for about 5 hours under a pressure of about 5 mmHg by using a DSC-2 Model differential scanning calorimeter (made by Perkin-Elmer Co.) is encapsulated in an aluminum pan for liquid in a nitrogen atmosphere. Subsequently, the specimen is rapidly elevated in temperature from room temperature to 290° C. at which the specimen is kept in a molten state for 10 minutes, followed by quenching to room temperature. Thereafter, a peak maximum of exothermic peaks obtained by detection at the time of elevating the temperature at a rate of 10° C./min is taken as a programmed-temperature crystallizing temperature (Tcl).

The melting point (Tm) of the starting polyethylene terephthalate is expressed in terms of a peak maximum of exothermic peaks as measured under the same conditions as in the case of the above-mentioned programmed-temperature crystallizing temperature (Tcl).

The process for preparing the above-mentioned starting polyethylene terephthalate used in the present invention is illustrated hereinafter.

The preferred starting polyethylene terephthalate used in the invention may be prepared by a direct polymerization process. Practically speaking, there is employed the process in which a lower condensate is obtained by allowing a mixture of terephthalic acid and ethylene glycol to undergo reaction continuously in the course of esterification reaction of at least two stages, a polyester is obtained by allowing the lower condensate further to undergo polycondensation under reduced pressure in the course of liquid phase polycondensation of at least two stages, polyester chips are formed by melt extrusion of the polyester, and the polyester chips are allowed to undergo polycondensation in an inert gas atmosphere in the course of solid phase polymerization, thereby increasing the resulting polycondensate in its intrinsic viscosity [η].

Subsequently, each step of the above-mentioned process and the conditions under which the step is carried out are illustrated hereinafter.

The starting polyethylene terephthalate as illustrated above may be obtained by suitably selecting the conditions under which each step is carried out and controlling the polycondensation reaction so that (A) the composition of the resulting polyethylene terephthalate and (B) an intrinsic viscosity thereof are respectively in the range as defined in the present invention.

Concretely speaking, an ethylene glycol slurry of terephthalic acid is first formed from a mixture of terephthalic acid and 1.02–1.4 moles, preferably 1.03–1.3 moles, based on 1 mole of the terephthalic acid, of ethylene glycol. The slurry as formed is supplied continuously to the step of esterification reaction. The esterification reaction is carried out under the condition where the ethylene glycol is refluxed by using an apparatus having at least two esterification reactors connected in series, while removing water resulting from the reaction out of the system by means of a fractionating column. The esterification reaction is carried out under such conditions that the temperature employed in the first-stage esterification reaction is usually 240–270° C, preferably 245–265° C., and the pressure employed likewise is usually 0.2–3 kg/cm$^2$.G, preferably 0.5–2 kg/cm$^2$.G, and the temperature employed in the final-stage esterification reaction is usually 250–280° C, preferably 255–275° C., and the pressure employed likewise is usually 0–1.5 kg/cm$^2$.G, preferably 0–1.3 kg/cm$^2$.G. Accordingly, when the esterification reaction is carried out in two stages, the first stage and second stage esterification reaction conditions are respectively in the range as defined above, and when the esterification reaction is carried out in three stages or more, the conditions under which the esterification reaction is continuously carried out from the second stage to the stage prior to the final stage are intermediate between those employed for the first and final stage reactions, respectively. For example, when the esterification reaction is carried out in three stages, the temperature employed in the second stage reaction is usually 245–275° C, preferably 250–270°°C., and the pressure used likewise is usually 0–2 kg/cm$^2$.G, preferably 0.2–1.5 kg/cm$^2$.G. Though no particular limitation is placed on the conversion in each stage of the esterification reaction, it is desirable that the rise and rate of the conversion in each stage of the esterification reaction are smoothly distributed, and the conversion of the esterification reaction product obtained in the final stage is usually at least 90%, preferably at least 93%. Through these esterification steps as mentioned above, there is obtained a lower condensate having a number average molecular weight usually of 500–5000.

The lower condensate thus obtained is then supplied to a polycondensation reactor of the subsequent liquid polycondensation step. The conditions under which the polycondensation reaction is carried out are such that the reaction temperature of the first stage polycondensation is usually 260–290° C., preferably 265–290° C. and especially 270–285° C., the pressure is usually 500–20 Torr, preferably 200–30 Torr, and the temperature of the final stage polycondensation reaction is usually 270–300° C., preferably 275–295° C., and the pressure is usually 10–0.1 Torr, preferably 5–0.5 Torr.

When the polycondensation reaction is carried out in two stages, the polycondensation reaction conditions employed in the first and second stages, respectively, are as defined above, and when said reaction is carried out in three stages or more, the reaction conditions for the polycondensation reaction from the second stage to the stage prior to the final stage are those intermediate between the reaction conditions for the first stage and final stage, respectively. For example, when the polycondensation reaction is carried out in three stages, the reaction temperature of the second stage polycondensation reaction is usually 265–295° C., preferably 270–290° C. and especially 270–285° C., and the pressure is usually 50–2 Torr, preferably 40–5 Torr. Though no particular limitation is placed on the intrinsic viscosity [η] to be attained in each step of the polycondensation reaction, it is desirable that the degree of rise in intrinsic viscosity in each step is smoothly distributed throughout the polycondensation reaction process. The polyethylene terephthalate obtained from the polycondensation reactor of the final stage has an intrinsic viscosity [η] of usually 0.55–0.72 dl/g, preferably 0.57–0.68 dl/g. The polyethylene terephthalate obtained from the final polycondensation reactor in the manner mentioned above is then formed by melt extrusion molding into chips.

Further, the chips of this polyethylene terephthalate are supplied to the subsequent solid phase polycondensation step. The solid phase polycondensation of the polyethylene terephthalate chips is carried out at least in one stage, wherein the solid phase polycondensation reaction is carried out in an inert gas atmosphere such as nitrogen gas, argon gas and carbonic acid gas under such conditions that the polycondensation temperature is usually 190–230° C., preferably 195–225° C., and the pressure is usually 1 kg/cm$^2$.G to 10 Torr, preferably from normal pressure to 100 Torr. Of the inert gases mentioned above, preferred is nitrogen gas.

The aforementioned esterification reaction can be carried out without addition of additives other than terephthalic acid and ethylene glycol, and also can be carried out in the presence of the polycondensation catalysts as will be mentioned later. Further, this esterification is carried out favorably by the addition of small amounts of tertiary amines such as triethylamine, tri-n-butylamine and benzylmethylamine, quaternary ammonium hydroxides such as tetraethylammonium hydroxide, tetra-n-butylammonium hydroxide and trimethylbenzylammonium hydroxide, and basic compounds such as lithium carbonate, sodium carbonate, potassium carbonate and sodium acetate, because the proportion of dioxyethylene terephthalate component units in the main chain of the resulting polyethylene terephthalate can be maintained at a relatively low level.

These basic component compounds may be added, without particular limitation on the manner of addition, to all the esterification reactors employed, or may be added to a specific reactor or reactors of stages subsequent to the first or second stage reactor. The polycondensation reaction is preferably carried out in the presence of catalysts and stabilizers. The catalysts used include germanium compounds such as germanium dioxide, germanium tetraethoxide and germanium tetra-n-butoxide, antimony catalysts such as antimony trioxide, and titanium catalysts such as titanium tetrabutoxide. Of these catalysts, preferred is germanium dioxide, because the use of germanium dioxide results in excellent hue and transparency of the resulting polyethylene terephthalate. The stabilizers used include phosphoric esters such as trimethyl phosphate, triethyl phosphate, tri-n-butyl phosphate, trioctyl phosphate, triphenyl phosphate and tricresyl phosphate, phosphorous acid esters such as triphenyl phosphite, tridodecyl phosphite and tris(nonylphenyl)phosphite, phosphoric acid esters such as methyl acid phosphate, isopropyl acid phosphate, butyl acid phosphate, dibutyl phosphate, monobutyl phosphate and dioctyl phosphate, and phosphorus compounds such as phosphoric acid and polyphosphoric acid. The amount, based on the weight of the mixture of terephthalic acid and ethylene glycol, of the catalyst used is usually 0.0005–0.2% by weight, preferably 0.001–0.05% by weight in terms of the weight of metals in the catalyst, and similarly the amount of stabilizer used is usually 0.001–0.1% by weight, preferably 0.002–0.02% by weight in terms of the weight of phosphorus atoms in the stabilizer. These catalysts and stabilizers may be supplied to the stage of the esterification reaction step or to a first stage reactor of the polycondensation reaction step.

The starting saturated crystalline polyester resins as starting materials in the present invention are used in the form of pellets which may be used under varying forms such as strand, sheet, lump and powder.

The pellets of the starting saturated crystalline polyester resins used may be those newly prepared or those obtained by pulverizing a parison or container once molded from the starting unsaturated crystalline polyester resins or mixtures thereof.

In the first process for molding the saturated crystalline polyesters of the invention, the above-mentioned starting saturated crystalline polyester resin pellets are fed to a molding machine having a screw and comprising a feed section, a compression section and a metering section, and then molded into a desired shape. In that case, the starting saturated crystalline polyester resins are heated to a temperature above the melting point of said polyester resin in the molding machine so that the polyester resins in a substantially molten state reach the compression section of the molding machine.

The molding machine used for molding the saturated crystalline polyester resins in the invention includes, by way of illustration but not of limitation, an injection molding machine, extrusion molding machine, compression molding machine or blow molding machine.

The screw of the molding machine is usually separated into three portions, i.e. a feed section, a compression section and a metering section, extending from the starting material feeding position to the nozzle side. This feed section is a section to deliver the starting resin by means of a screw channel to the compression section in which the screw channel gradually becomes shallow, and in this section the molten resin is compressed and homogeneously kneaded to remove the air caught in said molten resin. The metering section is a section to determine accurately the amount of the molten resin and accumulate the determined molten resin for the subsequent injection molding.

When the starting saturated crystalline polyester resin is treated in the manner as in the first process for molding the starting polyester resins of the present invention as aforesaid, no large mechanical shearing is applied to the saturated polyester resin within the molding machine particularly in the compression section thereof, because said polyester resin being treated is in a molten state and is low in viscosity. In the first molding process of the invention as illustrated above, it is so designed that the mechanical shearing applied to the saturated crystalline polyester resin at the time of molding thereof is made small as far as possible. On that account, the molding article obtained by the present first molding process will not largely decrease in its crystallizing temperature (Tc2) in comparison with that of the starting unsaturated crystalline polyester resin. That is, when the crystallizing temperature of the starting unsaturated crystalline polyester resin constituting a molded article obtained in the manner as mentioned above is taken as Tc2, and the crystallizing temperature of the starting unsaturated crystalline polyester resin used at the time of molding is taken as Tc1, the crystallizing temperature Tc2 of the molded article obtained satisfies the following relationship.

$$Tc1 - 20 \leq Tc2 \leq Tc1$$

According to the present invention, because the crystallizing temperature Tc2 of the molded article obtained will not become lower by a excess of 20° C. than the crystallizing temperature Tc1 of the starting unsaturated crystalline polyester resin, this molded article or a molded article obtained by further molding this molded article is excellent in transparency, free from chalking or variation in internal volume, and excellent in heat resistance.

In contrast thereto, according to the conventional processes for molding saturated crystalline polyester resins, the starting saturated crystalline polyester resins are supplied to a molding machine in a state where said starting resin is heated only up to such a temperature at which the starting resin is usually dried, are high in viscosity because they are not sufficiently heated prior to reaching a compression section of the molding machine, and are given a large mechanical shearing in the compression section, whereby the crystallizing temperature (Tc2) of the resulting molded article becomes lower by a excess of 20° C. than the crystallizing temperature of the starting unsaturated crystalline polyester resin. If the crystallizing temperature of the molded article is lower by in excess of 20° C. than the crystallizing temperature of the starting unsaturated crystalline polyester resin, this molded article or a molded article obtained by further molding this molded article will decrease in transparency and dimensional stability and also in heat resistance.

Practically speaking, when polyethylene terephthalate having a crystallizing temperature Tc1 of 171° C. as a starting unsaturated crystalline polyester resin is molded according to the present invention into a molded article, a crystallizing temperature Tc2 of the resulting molded article is 155–170° C., whereas a crystallizing temperature Tc2 of a molded article obtained according to the conventional processes from the starting polyethYlene terephthalate which has reached in a substantially unmolten state to a compression section of the molding machine employed will largely decrease to 130–150° C. From the foregoing, it follows that the molded article obtained by the present invention is excellent in transparency and dimensional stability, whereas the molded articles obtained by the conventional processes decreases largely in transparency and dimensional stability.

The starting saturated crystalline polyester resin heated to a temperature above its melting point and in a substantially molten state is allowed to reach the compression section of molding machine by the following manner.

That is, the starting saturated crystalline polyester resin is dried by preheating to a temperature below its melting point, preferably a temperature lower by 10–90° C. than the melting point, and the preheated polyester resin is supplied to the molding machine. The screw of this molding machine is separated into three sections, i.e. the feed, compression and metering sections. The temperature employed in the feed section is preset to a temperature higher than the temperature conventionally employed, that is, the temperature of the feed section is preset to a temperature higher than the melting point of the starting saturated crystalline polyester resin, preferably a temperature higher by 90–40° C. than said melting point, so that the starting polyester resin is in a substantially molten state, and the molten polyester resin is then allowed to reach the compression section.

In that case mentioned above, it is also possible to preset the preheating and drying temperature for the starting saturated crystalline polyester resin at a considerably higher level than the conventionally used preheating and drying temperature.

In the second process for molding saturated crystalline polyesters of the present invention, the above-mentioned starting saturated crystalline polyester resin pellets are supplied to a molding machine to mold them into a desired shape and, in that case, said polyester resin is heated to a temperature above its melting point to bring it to a substantially molten state and the molten polyester resin is supplied to the molding machine.

The molding machine used in the second process of the invention includes, by way of illustration but not of limitation, an injection molding machine, extrusion molding machine, compression molding machine or blow molding machine.

When the starting saturated crystalline polyester resin is heated to a temperature above its melting point and supplied in a substantially molten state to the molding machine, no large mechanical shearing is applied to the starting polyester resin with the molding machine, particularly in a compression section of the molding machine, because said starting polyester resin is melted and low in viscosity. In the second molding process of the invention, it is so designed that the mechanical shearing applied to the starting saturated crystalline polyester resin at the time of molding is made small as far as possible and, on that account, the crystallizing temperature (Tc2) of the resulting molded article will not decrease largely in comparison with the crystallizing temperature of the starting saturated crystalline polyester resin. That is, when the crystallizing temperature of the saturated crystalline polyester resin constituting a molded article obtained in the above-mentioned manner from the starting saturated crystalline polyester resin is taken as Tc2 and the crystallizing temperature of said starting saturated crystalline polyester resin is taken as Tcl, the crystallizing temperature of the molded article obtained satisfies the following relationship.

$$Tcl - 20 \leq Tc2 \leq Tcl$$

According to the second molding process of the present invention, because the crystallizing temperature (Tc2) of the molded article obtained will not decrease by an excess of 20° C. than the crystallizing temperature Tcl of the starting saturated crystalline polyester resin in the same manner as in the first molding process, this molded article or a molded article obtained by further molding this molded article is excellent in transparency and in dimensional stability, free from chalking or variation in internal volume, and also excellent in heat resistance.

The starting saturated crystalline polyester resin brought to a substantially molten state by heating to a temperature above its melting point may be delivered to the compression section of the molding machine by using molding equipment as will be mentioned below.

The molding equipment for the saturated crystalline polyester resin mentioned above is illustrated hereinafter.

This molding equipment comprises, as shown in FIG. 1, a molding machine body A to melt the starting saturated crystalline polyester resin and mold the molten polyester resin into a desired shape, and a starting resin feed section B to supply the molten starting resin to said molding machine body A.

The molding machine body A may be of any structure so long as it is capable of molding the starting resin melted by heating in the starting resin feed section mentioned later into a desired shape, for example, a preform for blow molded article and sheet. The molding machine body A used includes, by way of illustration and not of limitation, an injection molding machine, extrusion molding machine, compression molding machine or blow molding machine.

The injection molding machine taken as an example of the molding machine body A is illustrated hereinafter. This molding machine body A has a structure wherein a heating cylinder 2 provided inside with a reciprocating screw 1 and a cylinder 4 provided inside with a reciprocating injection ram 3 are connected in series to each other.

The screw 1 is provided at the head portion with a nozzle 5 to inject the molten starting resin into a mold (not shown). The screw 1 is separated into three portions: a feed section, compression section and metering section, extending from the position of the starting material feeding section provided usually at the rear end of the cylinder 2 from the nozzle side.

The injection ram 3 is so designed that it reciprocates within the cylinder 4 by means of an oil pressure motor 6.

The heating cylinder 2 of the molding machine body A is provided with the starting resin feed section B to supply the starting resin to said body A. This starting resin feed section B is provided at the side of the injection ram of the heating cylinder 2.

The molding equipment used in the present invention is different from the conventional injection molding machine in structure of this starting resin feed section B.

That is, in the molding equipment used in the invention shown in FIG. 1, in order that the starting saturated crystalline polyester resin is heated to a temperature above its melting point and supplied in a substantially molten stage to the molding machine body A, the starting resin feed section B comprises a drying hopper 8 to dry the starting resin by heating to a temperature below its melting point, a section to bring the starting resin dried in the drying hopper 8 to a substantially molten state by heating said resin to a temperature above its melting point (hereinafter simply called the melting section 9) and a quantitative feed section 10 to supply the starting resin heated and brought to a substantially molten state to inside the molding machine body A by quantitative determination.

The drying hopper 8 is loaded with a predetermined amount of the starting saturated crystalline polyester resin in the form of pellets which may be of any shape as previously illustrated.

The melting section 9 is equipped with a heat melting cylinder 11 and a torpedo 13 to shunt the starting resin channel 12 (hereinafter called simply the channel) in the heat melting cylinder 11.

The heat melting cylinder 11 has a heater 14 at predetermined places of its outer periphery, said heater 14 being maintained at a temperature capable of heating the starting resin introduced into the channel 12 from the drying hopper 8 to a temperature above its melting point and bringing said starting resin to a substantially molten state.

The channel 12 is fitted at the rear end with a reciprocating plunger 15 and is connected at the front end to the quantitative feed section 10 illustrated later. In the intermediate portion of the channel 12, the torpedo 13 to shunt the channel 12 toward the heater 14 is fixed to the inner wall of the heat melting cylinder 11 by means of a supporting member (not shown). By means of the torpedo thus arranged, the starting resin introduced into the channel 12 is heated and melted efficiently and uniformly by the heater 14.

The quantitative feed section 10 is equipped with a heating cylinder 16, a reciprocating plunger 18 is fitted inside a metering section 17 formed by drilling inside the heating cylinder 16, a nozzle 19 to feed the molten starting resin into the molding machine body A and a changeover valve 20.

On predetermined places of the outer peripheral surface of the heating cylinder 16, heaters 21 are provided so that the temperature of the starting resin melted in the melting section 9 is maintained at the same level as melted.

The metering section 17 accurately determines the amount of the molten resin fed thereinto from the channel 12 of the melting section 9 and accumulates said molten resin for the subsequent injection molding. This metering section 17 and the channel 12, and said metering section 17 and the nozzle 19 are connected to each other by the changeover valve 20. That is, after a given amount of the molten resin is introduced into the metering section 17 by communicating the channel 12 with the metering section 17 by means of the changeover valve 20 (the state as shown in FIG. 1), the changeover valve 20 is then changed over so as to communicate only the metering section 17 with the nozzle 19 (in the state shown in FIG. 1, the changeover valve is turned 90° in the clockwise direction), whereby the molten resin present in the metering section 17 is quantitatively fed by means of the plunger 18 into the nozzle 19.

The nozzle 19 is connected to the molding machine body A via a pipe 22, the starting molten resin is quantitatively supplied via the pipe 22 to the feed section of the screw 1, whereby the molten resin is molded into a desired shape.

Figure 2:
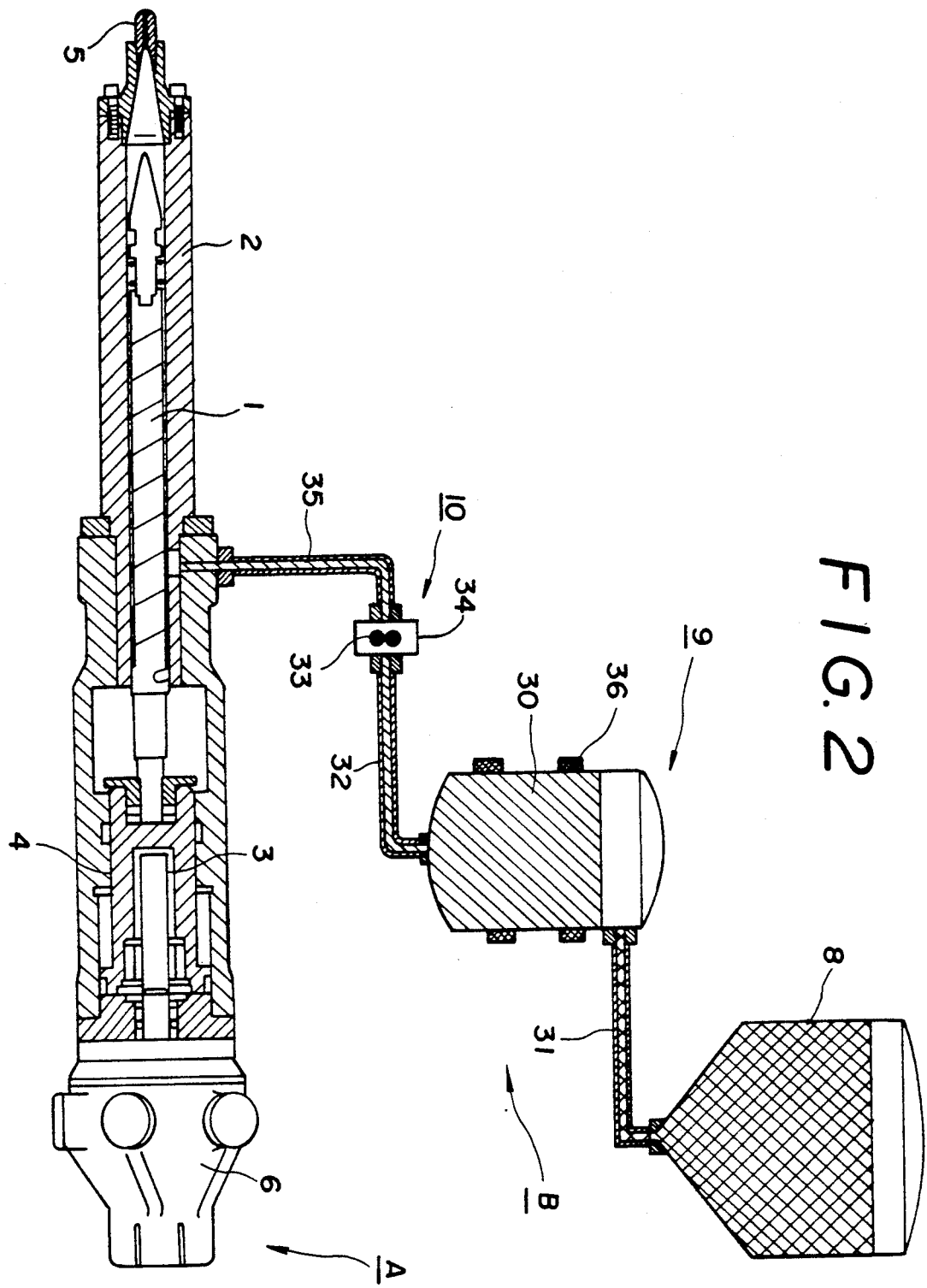

In the molding equipment of the present invention shown in FIG. 2 as a further embodiment thereof, the melting section 9 comprises a melting hopper 30 equipped with heaters 36 provided on the predetermined places of the outer peripheral surface of the melting hopper 30. To the melting hopper 30 is supplied the starting resin dried in the drying hopper 8 via the channel 31, and the starting resin thus supplied is heated to a temperature above its melting point and brought to a substantially molten state in the melting hopper 30. In that case, however, the residence time of the molten starting resin in the melting hopper 30 is preferably short as far as possible in order to inhibit deterioration caused by residence.

In the molding equipment shown in FIG. 2, the molten starting resin is supplied via the channel 32 to a quantitative feed section 10, and the quantitative feed section 10 is composed of a gear pump 34 having internal gears 33. The molten starting resin is fed quantitatively by revolution of the gears 33 into the molding machine body A via the channel 35.

In the molding equipment of the present invention shown in FIG. 3 as a further embodiment thereof, the melting section 9 is composed of a melting hopper 42 equipped with heaters 41 provided at predetermined places of the outer peripheral surface of the melting hopper 42. To the melting hopper 42 is supplied via a channel 43 the starting resin dried in the drying hopper 8, and the starting resin is heated in the melting hopper 42 to a temperature above its melting point and brought to a substantially molten state.

The quantitative feed section 10 of the molding equipment shown in FIG. 3 equipped with a plunger 44, and the starting resin heated in the melting hopper 42 and brought to a substantially molten state is supplied by means of the plunger 44, preferably in a quantitative manner, to the molding machine body A via a channel 45.

The function of the molding equipment for saturated crystalline polyesters shown in FIG. 1 is illustrated in more detail hereinafter.

The starting saturated crystalline polyester resin pellets supplied to the above-mentioned drying hopper 8 is heated at a temperature below the melting point of the resin, usually at 140-240° C. for 1-10 hours, preferably at 170-200° C. for 1-5 hours.

The pellets thus dried are then introduced into the melting section 9 and fed into the channel 12 by means of the plunger 15. In the melting section 9, the pellets are sufficiently heated up to its melting point by means of the heaters 14 and substantially melted. In that case, the channel 12 is in close vicinity to the heaters 14 as the torpedo 13 is provided within the channel 12, and hence the starting resin is heated and melted uniformly and efficiently, whereby the working efficiency is improved.

The heating temperature preferably employed in the melting section 9 is usually higher by 10−30° C. than the melting point of the starting resin, and the inside of the channel 12 of the melting section 9 is preferably filled with an inert gas or evacuated in order to inhibit oxidative deterioration of the starting resin.

The starting resin thus heated and melted is then fed into the metering section 17 of the quantitative feed section 10. In the quantitative feed section 10, the heated and melted resin may be maintained at a desired temperature range by means of the heaters 21 of the heating cylinder 16. After feeding the predetermined amount of the molten resin into the metering section 17, the channel 12 is shut off from the metering section 17 by the change-over of the changeover valve in the manner as mentioned previously, and the molten resin is quantitatively fed into the nozzle 19.

The molten resin thus fed into the nozzle 19 is then quantitatively fed into the molding machine body A via the pipe 22.

In the molding equipment shown in FIG. 2, the pellets dried in the drying hopper 8 are introduced via the channel 31 into the melting section 9. The pellets are heated in the melting section 9 and brought to a substantially molten state.

The heating temperature preferably employed in the melting section 9 is usually higher by 10-30° C. than the melting point of the starting resin, and the inside of the melting hopper 30 is preferably filled with an inert gas or evacuated in order to inhibit oxidative deterioration of the starting resin.

The starting resin thus heated and melted is then fed via the channel 32 into the gear pump 34. The molten resin is then fed from the gear pump 34 by revolution of the gears 33 into the molding machine body A via the channel 35.

In the molding equipment shown in FIG. 3, the pellets dried in the drying hopper 8 is fed via the channel 43 into the melting section 9.

The starting resin heated and brought to a substantially molten state in the melting section 9 is fed, preferably in a quantitative manner, into the molding machine body A via the channel 45 by means of a reciprocating plunger 44 inserted into the melting hopper 42 constituting the melting section sections, i.e. the feed section, compression section and metering section, and caught therein, quantitatively determined with accuracy, lead to the head portion of nozzle and injected by the injection ram 3 into a mold (not shown), whereby the molten starting resin is molded into a desired shape.

When the saturated crystalline polyester resins are molded into desired shapes by using the molding equipment equipped with the above-mentioned molding machine body A and starting resin feed section B, the starting resin is heated to a temperature above its melting point, supplied in a substantially molten state to the molding machine body A and delivered in a state of being low in viscosity to the compression section of the screw 1, and hence the mechanical shearing applied in this compression section to the saturated crystalline polyester resin is small. Accordingly, even when the saturated crystalline polyester resin is molded into a desired shape, the crystallizing temperature Tc2 of the resulting molded article does not substantially decrease in comparison with the crystallizing temperature Tc1 of the starting saturated crystalline polyester resin. On that account, the molded article thus obtained is excellent in transparency and dimensional stability, free from chalking or variation in internal volume and also excellent in heat resistance.

In the conventional molding equipment for saturated crystalline polyester resin, however, it has been so designed that the starting saturated crystalline polyester resin is usually heated in the starting resin feed section up to such a temperature at which the starting resin is dried, and the starting resin thus heated is supplied to the molding machine body. On that account, the starting saturated crystalline polyester resin delivered to the compression section is high in viscosity, because the resin is not heated sufficiently before arriving at the compression section, and the crystallizing temperature (Tc2) of the resulting molded article largely decreases in comparison with the crystallizing temperature Tcl of the starting saturated crystalline polyester resin. If the crystallizing temperature of the molded article becomes largely lower than that of the starting saturated crystalline polyester resin, this molded article or a molded article obtained by molding further this molded article decreases in transparency and dimensional stability and also in heat resistance. In this manner, the molding equipment of the present invention has successfully solved the problems associated with the conventional molding equipment.

The saturated crystalline polyester resins used in the present invention may be suitably incorporated, if necessary, with various additives such as conventionally known nucleating agents, inorganic fillers, lubricants, slip agents, antiblocking agents, stabilizers, antistatic agents, antifoggants and pigments. Further, the saturated crystalline polyester resins used in the invention may also be incorporated, if necessary, with suitable amounts of known resins having gas barrier properties other than polyethylene terephthalate.

The molded articles obtained by the molding equipment of the present invention may be of various shapes such as bottle and the like. Furthermore, the molded articles obtained in the present invention may be preforms for blow molding.

The above-mentioned blow molding preforms may be molded by the above-mentioned process, for example, single-layer preforms may be molded by the injection molding process, and multilayer preforms may be molded by the multilayer injection molding process. Further, tubular products having similar laminated structures may also be prepared likewise. When the starting polyethylene terephthalate preferred in the present invention is used for preparing preforms according to the injection molding process, staining and clogging of an airvent portion of the mold at the time of injection molding remarkably lessen, with the result that the cleaning operation of the mold can be made less frequent and productivity of the preforms is greatly improved.

Blow molded containers may be prepared by stretch blow molding the above-mentioned blow molding preforms. In the same manner as in the case of the aforementioned preforms, the blow molded containers may be formed from a single-layer of saturated crystalline polyester resin or from a multilayer comprising at least a saturated crystalline polyester resin layer and a layer of resin having gas barrier properties other than polyethylene terephthalate. In the case of the multilayer blow molded containers, the resin layers other than polyethylene terephthalate layers may be of the outermost, innermost or intermediate layer.

The blow molded containers are usually being stretched, either monoaxially or biaxially. In the case of monoaxially stretched blow molded containers, the stretch ratio employed therein is usually 1.1–10 times, preferably 1.2–8 times and especially 1.5–7 times, and in the case of biaxially stretched blow molded containers, the stretch ratio employed therein is usually 1.1–8 times, preferably 1.2–7 times and especially 1.5–6 times in the vertical axis direction, and usually 1.1–8 times, preferably 1.2–7 times and especially 1.5–6 times in the traverse axis direction.

When the starting polyethylene terephthalate preferred in the present invention is used in preparing the above-mentioned blow molded containers or the like by the monoaxial or biaxial stretch blow molding process, productivity of the resulting blow molded articles, particularly those obtained by biaxial stretch blow molding, is greatly improved as staining of the blow molding mold markedly lessens and cleaning of said mold can be made less frequent.

The blow molded containers may be prepared by blow molding the aforementioned blow molding preforms in the manner mentioned above. The heating temperature employed in this blow molding is usually 80–130° C., preferably 85–125° C., and the blow molding mold temperature employed is usually from ordinary temperature to 200° C., preferably 40–180° C. Heat setting the resulting blow molded containers may be carried out by conventionally known methods, and the heat setting temperature employed therefor is usually 100–180° C., preferably 120–160° C.

EFFECT OF THE INVENTION

Molded articles formed from saturated crystalline polyesters according to the present invention are excellent in transparency and dimensional stability, free from chalking or variation in internal volume and also excellent in heat resistance.

The present invention is illustrated below with reference to examples, but it should be construed that the invention is in no way limited to the examples.

Example 1

With a continuous polycondensation equipment comprising the first, second, third, fourth and fifth reactors of a tank type and the sixth reactor which is a two-way rotary type horizontal reactor, continuous polymerization was carried out in the following manner to prepare polyethylene terephthalate.

To the first reactor having previously retained therein 3750 parts by weight of a reaction liquid and maintained at 255° C. with stirring and at a pressure of 1.7 kg/cm$^2$.G in a nitrogen atmosphere was added continuously every hour a slurry prepared by mixing 1437 parts by weight of high purity terephthalic acid with 645 parts by weight of ethylene glycol to carry out esterification reaction of the first stage. In this first stage esterification reaction, a mixture of 203 parts by weight of water and 3 parts by weight of ethylene glycol was distilled off. The second stage esterification reaction product was then lead to the second reactor so controlled that the average residence time becomes 2.0 hours and maintained with continuous stirring at 260° C. and 0.8 kg/cm$^2$.G. To the second reactor was continuously supplied every hour a homogeneous solution comprising 0.35 part by weight of germanium dioxide and 32 parts by weight of ethylene glycol, and simultaneously from said second reactor was distilled off every hour a mixture of 84 parts by weight of water and 7 parts by weight of ethylene glycol to carry out the second stage esterification reaction. The second stage esterification reaction product was then lead to the third reactor so controlled that the average residence time becomes 2.0 hours and maintained with continuous stirring at 265° C. and normal pressure. To the third reactor was continuously supplied every hour a homogeneous solution comprising a mixture of 1.23 parts by weight of trimethyl phosphate and 22 parts by weight of ethylene glycol, and simultaneously from said third reactor distilled off every hour a mixture comprising 21 parts by weight of water and 38 parts by weight of ethylene glycol to carry out the third stage esterification reaction.

The third stage esterification reaction product was lead to the fourth reactor so controlled that the average residence time becomes 2.0 hours and maintained with continuous stirring at 275° C. and 77 mmHg. In the fourth reactor, a mixture comprising 62 parts by weight of ethylene glycol and 6 parts by weight of water was distilled off every hour to carry out the first stage polycondensation reaction. The first stage polycondensation reaction product was lead to the fifth reactor so controlled that the average residence time becomes 1.0 hour and maintained with continuous stirring at 280° C. and 5 mmHg.

In the fifth reactor, a mixture comprising 26 parts by weight of ethylene glycol and 3 parts by weight of water was continuously distilled off every hour to carry out the second stage polycondensation reaction. The second stage polycondensation reaction product was lead to the sixth reactor, i.e. a horizontal two-way rotary type reactor, so controlled that the average residence time becomes 1.0 hour and maintained with continuous stirring at 282-285° C. and 1.82-2.5 mmHg.

In the sixth reactor, a mixture comprising 12 parts by weight of ethylene glycol and 1 part of water was continuously distilled off every hour to carry out the third stage polycondensation reaction. The third stage polycondensation reaction product so controlled that its average residence time becomes 2.5 hours was continuously extracted in the form of strand outside the reactor by a polyester extractor, cooled by immersion in water, and then cut into chips by a strand cutter. The polyethylene terephthalate obtained by the above-mentioned liquid phase polymerization had an intrinsic viscosity [$\eta$] of 0.62 dl/g as measured at 25° C. in o-chlorophenol, and contained 2.50 mol % of dioxyethylene terephthalate component.

This polyethylene terephthalate obtained by liquid phase polymerization was then dried and crystallized for about 15 minutes at about 140° C. in a nitrogen atmosphere, packed in a column type solid phase polymerizer, followed by solid phase polymerization at 205° C. for 15 hours in a nitrogen atmosphere. The thus obtained polyethylene terephthalate had an intrinsic viscosity [$\eta$] of 0.80 dl/g as measured at 25° C. in o-chlorophenol, contained 2.53 mol % of dioxyethylene terephthalate component, and a programmed temperature crystallizing temperature Tc1 of 174° C.

Subsequently, the polyethylene terephthalate obtained above was dried for about 4 hours at about 180° C. in a nitrogen atmosphere, and then fed to an injection molding machine (M100A Model of Meiki) wherein the cylinder temperatures of the feed, compression and metering sections were preset to 320° C., 300° C. and 270° C., respectively, the polyethylene terephthalate in a substantially molten state was supplied to the compression section, and injected into a preform molding mold cooled to 10° C. at a molding pressure of about 800 kg/cm$^2$ to prepare a preform of 28 mm in external shape and 4 mm in thickness. Thereafter, only the neck portion of this preform was crystallized in an oil bath at 160° C. The thus obtained preform had an intrinsic viscosity [$\eta$] of 0.76, and Tc2 of 158.1° C.

The neck-crystallized preform was biaxially stretched lengthwise to about two times and crosswise to about three times by using a biaxial stretch molding machine (LBO1 of Corpo-Plast Co.) under such conditions, that the blowing pressure is about 20 kg/cm$^2$, the preform heating temperature is about 60 seconds and the stretching temperature is about 100° C., the stretched preform was kept for about 10 seconds in a mold having the surface temperature of about 140° C., and heat set by cooling the mold to prepare a biaxially stretched bottle with a raised-bottom of an internal volume of 1.0 liter having six pieces of pressure reducing panel at the body portion. In the bottle thus obtained, the stretched portion thereof was excellent in transparency as evidenced by the measured Haze value of 0.5%, and no deformation was observed even after filling the bottle with hot water.

Comparative Example 1

Example 1 was repeated except that the cylinder temperatures of the feed section, compression and metering section were preset to 265° C., 270° C. and 290° C. The preform thus obtained had an intrinsic viscosity [$\eta$] of 0.77 and Tc2 of 146° C.

In this case, the polyethylene terephthalate reaching the compressing section of the injection molding machine was not sufficiently melted and hence underwent a large mechanical shearing in the compression section.

In the bottle obtained, the stretched portion thereof had a Haze value of 5.0% which was far inferior to that of Example 1.

Example 2

Chips of crystallized polyethylene terephthalate (intrinsic viscosity [$\eta$]=0.78 dl/g, density 1.400 g/cm$^3$, melting point Tm=253° C., programmed temperature crystallizing temperature Tc1=17.1° C.) were dried in a dehumidification type dryer at 150° C. for 4 hours, packed in a metallic can in a nitrogen atmosphere, and cooled to room temperature.

The above-mentioned chips were brought to a substantially molten state by heating at the resin temperature of 270° C. for 5 minutes by means of a dryer with an electric heater, pressed into a screw-in-line injection molding machine, and molded by injecting into a parison mold (32 pieces of parisons, barrel temperature 15° C.) at an injection pressure of 500 kg/cm$^2$ to obtain amorphous parisons, each 4 mm in body thickness and 60 g in weight. 32 pieces of the parisons thus obtained had an intrinsic viscosity [$\eta$] of from 0.73 to 0.74 dl/g, and crystallizing temperature Tc2 of the polyethylene terephthalate as molded was from 168 to 170° C.

The top portion of the above-mentioned parison was crystallized at 170° C. for 5 minutes by means of an infrared heater, and the parison was stretch molded at a stretching temperature of 105° C, the stretch ratio: 2 times in the axial direction, 3 times in the peripheral direction, and a mold temperature of 140° C into a 1.5 liter cylindrical container (the body portion with 6 sheets of panel; hereinafter this container is called the heat-resistant container). The heat-resistant container thus obtained was favorable in transparency, heat resistance and shape of container (shape of pencil), and variation in internal volume was small.

| Physical properties | | Variations in 100 containers | | Evaluation |
|---|---|---|---|---|
| | | Min. value | Max. value | |
| Transparency Haze % | | from 1 to 5 (All containers are transparent.) | | Good |
| Heat resistance | | All containers withstand hot water of 85° C. | | Good |
| Shape of container | Dimension of top portion | All containers are in tolerance limits. | | Good |
| | Shape of panel | Shape of panel sufficiently appears in all containers. | | Good |
| Internal volume ml | | from 1520 to 1530 | | Good |

Comparative Example 2

Example 2 was repeated except that the chips cooled to room temperature after drying thereof were supplied, as they were, to the feed section of the injection molding machine, whereby parisons were obtained. 32 pieces of the parison thus obtained had an intrinsic viscosity of from 0.74 to 0.75, and the crystallizing temperature Tc2 of the parisons as molded was from 130 to 146° C.

In the same manner as in Example 2, the above-mentioned parisons were molded into 1.5 liter heat-resistant containers, whereupon they were greatly varied in transparency, heat resistance, shape of container and internal volume, and practically favorable containers obtained were only 20% of the total output.

| Physical properties | | Variations in 100 containers | | Evaluation |
|---|---|---|---|---|
| | | Min. value | Max. value | |
| Transparency Haze % | | from 3 to 30 (70% appears to be chalked) | | Bad greatly varied |
| Heat resistance | | 30 containers withstand hot water of 85° C., but 70 containers expand in panel portion. | | Bad greatly varied |
| Shape of container | Dimension of top portion | Only 20 containers in tolerance limits. | | Bad greatly varied |
| | Shape of panel | Only 20 containers are good in shape. | | Bad greatly varied |
| Internal volume ml | | from 1480 to 1525 | | Bad greatly varied |

Comparative Example 3

Example 2 was repeated except that the chips were supplied, immediately after drying at 150° C., to the feed section of the injection molding machine, whereby parisons were obtained. 32 pieces of the parison thus obtained had an intrinsic viscosity [η] of from 0.73 to 0.74, and the crystallizing temperature Tc2 of the parisons as molded was from 137 to 150° C.

In the same manner as in Example 2, the above-mentioned parisons were molded into 1.5 liter heat-resistant containers, whereupon they were greatly varied in transparency, heat resistance, shape of container and internal volume, and practically favorable containers obtained were only 30% of the total output.

| Physical properties | | Variations in 100 containers | | Evaluation |
|---|---|---|---|---|
| | | Min. value | Max. value | |
| Transparency Haze % | | from 2 to 30 (65% appears to be chalked) | | Bad greatly varied |
| Heat resistance | | 40 containers withstand hot water of 85° C., but 60 containers expand in panel portion. | | Bad greatly varied |
| Shape of container | Dimension of top portion | Only 30 containers in tolerance limits. | | Bad greatly varied |
| | Shape of panel | Only 35 containers are good in shape. | | Bad greatly varied |
| Internal volume ml | | from 1485 to 1523 | | Bad greatly varied |

Comparative Example 4

Example 2 was repeated except that the chips, immediately after drying thereof, were melted by heating at 310° C. for 5 minutes, and the melt was supplied to the feed section of the injection molding machine, whereby parisons were obtained. 32 pieces of the parison thus obtained had an intrinsic viscosity of from 0.65 to 0.67, and the crystallizing temperature Tc2 of the parisons as molded was from 135 to 141° C.

In the same manner as in Example 2, the above-mentioned parisons were molded into 1.5 liter heat-resistant containers, whereupon they were poor in transparency, heat resistance and shape of container, and also greatly varied in internal volume, and no practically favorable containers were contained at all.

| Physical properties | | Variations in 100 containers | | Evaluation |
|---|---|---|---|---|
| | | Min. value | Max. value | |
| Transparency Haze % | | from 10 to 50 (All containers appear to be chalked.) | | Bad |
| Heat resistance | | All containers deform on filling with hot water of 85° C. | | Bad |
| Shape of container | Dimension of top portion | All containers are in tolerance limits. | | Bad |
| | Shape of panel | All containers are bad in shape panel. | | Bad |
| Internal volume ml | | from 1490 to 1530 | | Bad greatly varied |

Example 3

1.5 liter cylindrical containers obtained in Example 2 (intrinsic viscosity [η] was from 0.73 to 0.74 dl/g, and the crystallizing temperature Tc2 thereof, after heating, was from 168 to 170° C) were mechanically pulverized into chips, and the chips were molded into parisons in the same manner as in Example 2 to obtain parisons. The parisons thus obtained had an intrinsic viscosity [η] of from 0.71 to 0.72 dl/g, and the crystallizing temperature Tc2, after heating, of the parisons as molded was from 162 to 165° C. In the same manner as in Example 2, the above-mentioned parisons were molded into 1.5 liter cylindrical containers, whereupon they were favorable in transparency, heat resistance and shape of container, and variations observed therein were small.

| Physical properties | | Variations in 100 containers | | Evaluation |
| --- | --- | --- | --- | --- |
| | | Min. value | Max. value | |
| Transparency Haze % | | from 1 to 6 (All containers are transparent.) | | Good |
| Heat resistance | | All containers withstand hot water of 85° C. | | Good |
| Shape of container | Dimension of top portion | All containers are in tolerance limits. | | Good |
| | Shape of panel | Shape of panel sufficiently appears in all containers. | | Good |
| Internal volume ml | | from 1521 to 1532 | | Good |

What is claimed is:

1. A process for molding a dried saturated crystalline polyester resin into an article having a desired shape which comprises heating a starting saturated crystalline polyester resin having a crystallization temperature $Tc_1$ of at least about 165° C. to a temperature above the melting temperature of the resin, thereby lowering the viscosity of the resin, compressing and kneading the molten polyester resin of lowered viscosity such that mechanical shearing applied to the reduced viscosity molten resin, during said compression and kneading, does not substantially decrease the crystallizing temperature of the resulting molded article, and discharging the sheared molten polyester resin into a mold to form said molded article, whereby the molded article has a crystallization temperature $Tc_2$ (°C.), wherein $Tc_1 - 20°$ C. $\leq Tc_2 \leq Tc_1$.

2. The process as claimed in claim 1 wherein the saturated crystalline polyester resin is polyethylene terephthalate.

3. The process of claim 1 wherein the raw saturated crystallatine polyester resin is brought to and maintained at a temperature 40 to 90° C. higher than the melting point of said polyester resin.

4. The process of claim 1 wherein the crystallizing temperature, $Tc_1$, of the starting unsaturated crystalline polyester resin is in the range of 167 to 180° C.

5. The process of claim 1 which further comprises first heating the starting saturated crystalline polyester resin to a temperature below its melting point to dry the polyester resin, and then further heating the dried resin to above its melting point.

* * * * *